US012637542B2

(12) United States Patent
Pineau et al.

(10) Patent No.: US 12,637,542 B2
(45) Date of Patent: May 26, 2026

(54) SELF-FLAME-RETARDANT COPOLYESTERAMIDE

(71) Applicant: Arkema France, Colombes (FR)

(72) Inventors: Quentin Pineau, Serquigny (FR); Jean-Jacques Flat, Serquigny (FR); Marie-Ange Lemaitre, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 944 days.

(21) Appl. No.: 17/614,017

(22) PCT Filed: May 27, 2020

(86) PCT No.: PCT/FR2020/050890

§ 371 (c)(1),
(2) Date: Nov. 24, 2021

(87) PCT Pub. No.: WO2020/240133

PCT Pub. Date: Dec. 3, 2020

(65) Prior Publication Data

US 2022/0220257 A1 Jul. 14, 2022

(30) Foreign Application Priority Data

May 27, 2019 (FR) ....................................... 1905595

(51) Int. Cl.
*C08G 69/44* (2006.01)
*C09K 21/14* (2006.01)

(52) U.S. Cl.
CPC .............. *C08G 69/44* (2013.01); *C09K 21/14* (2013.01)

(58) Field of Classification Search
None
See application file for complete search history.

(56) References Cited

U.S. PATENT DOCUMENTS

| | | | |
|---|---|---|---|
| 4,115,475 | A | 9/1978 | Foy et al. |
| 4,195,015 | A | 3/1980 | Deleens et al. |
| 4,230,838 | A | 10/1980 | Foy et al. |
| 4,331,786 | A | 5/1982 | Foy et al. |
| 4,332,920 | A | 6/1982 | Foy et al. |
| 4,711,931 | A | 12/1987 | Green |
| 4,839,441 | A | 6/1989 | Cuzin et al. |
| 4,864,014 | A | 9/1989 | Cuzin et al. |
| 2009/0017246 | A1 | 1/2009 | Malet |
| 2010/0197887 | A1 | 8/2010 | Takasawa et al. |
| 2011/0232944 | A1 | 9/2011 | Lee et al. |
| 2012/0108694 | A1 | 5/2012 | Malet et al. |

FOREIGN PATENT DOCUMENTS

| | | | | |
|---|---|---|---|---|
| CN | 105037715 | A | 11/2015 | |
| DE | 2546534 | A1 | 4/1977 | |
| EP | 0504058 | A1 | 9/1992 | |
| EP | 0506495 | A2 | 9/1992 | |
| EP | 1046675 | A1 | 10/2000 | |
| EP | 1057870 | A1 | 12/2000 | |
| EP | 1136512 | A1 | 9/2001 | |
| EP | 1155065 | A1 | 11/2001 | |
| EP | 1262527 | A2 | 12/2002 | |
| EP | 1270211 | A1 | 1/2003 | |
| EP | 2571939 | B1 | 5/2017 | |
| JP | 2002-080731 | A | 3/2002 | |
| JP | 2009-132821 | A | 6/2009 | |
| JP | 2009-526891 | A | 7/2009 | |
| JP | 2009215347 | A | 9/2009 | |
| JP | 5321457 | B2 | 10/2013 | |
| JP | 2019-056124 | A | 4/2019 | |
| WO | 9222600 | A1 | 12/1992 | |
| WO | 9512629 | A1 | 5/1995 | |
| WO | 2004037898 | A1 | 5/2004 | |
| WO | 2006121549 | A1 | 11/2006 | |
| WO | 2008/123450 | A1 | 10/2008 | |
| WO | 2010047469 | A1 | 4/2010 | |
| WO | WO-2018197173 | A1 * | 11/2018 | ......... C08G 63/6926 |

OTHER PUBLICATIONS

International Search Report (PCT/ISA/210) with translation and Written Opinion (PCT/ISA/237) mailed on Oct. 1, 2020, by the European Patent Office as the International Searching Authority for International Application No. PCT/FR2020/050890.
Office Action received for Japanese Patent Application No. 2021-570403, mailed on Jun. 25, 2024, 18 pages (8 pages of English Translation and 10 pages of Original Document).

* cited by examiner

*Primary Examiner* — Tanisha Diggs
(74) *Attorney, Agent, or Firm* — Boone IP Law

(57) ABSTRACT

The invention relates to a self-retardant copolyesteramide, characterised in that it is obtained by means of polycondensation of at least one polyamide monomer with at least one phosphorus-containing diol. The invention also relates to the use of such a copolyesteramide according to the invention for the manufacture of electrical and/or electrotechnical objects, tubes, cables, electrical safety objects, moulded objects, and/or objects obtained by 3D printing.

24 Claims, No Drawings

SELF-FLAME-RETARDANT COPOLYESTERAMIDE

FIELD OF THE INVENTION

The invention relates to a halogen-free flame-retardant polyamide-based thermoplastic elastomeric polymer (hereinafter TPE-A), and more particularly to a copolymer comprising at least one polyamide monomer, to a process for the production thereof by copolymerization, and to the use thereof as a flame-retardant material in all types of articles for which fire resistance is desired, for example in the electrical, consumer electronics, and electrical engineering sectors.

The copolymers targeted by the present invention are produced in particular from polyamide monomers containing at least 8 carbon atoms, preferably at least 10 carbon atoms; as opposed to monomers containing fewer than 8 carbon atoms used for so-called "commodity" polyamides, such as PA6 and PA66, of which the amounts (volumes) sold are much greater and the costs much lower than those of technical or specialty polyamides.

TECHNICAL BACKGROUND

The use of non-halogenated flame retardants is needed in order to replace halogenated flame retardants, which have the disadvantage of giving rise to toxic and corrosive vapors in the event of ignition.

Patent documents WO 2010/047469, JP 2009 215347, WO 2006/121549, and EP2571939 describe in particular TPE (thermoplastic elastomeric polymer) compositions that are both halogen-free flame retardants and have good mechanical properties.

The UL 94 test (standard NF T 51-072) provides a means of classifying materials according to their fire behavior. Materials receive ratings ranging from V0, for a material having very good flame-propagation resistance properties, to not classified (NC), for materials having no fire resistance. The criteria for this classification are summarized in Table 1 of the examples hereinbelow.

Flame retardants effective on one type of polymer are not necessarily effective as flame retardants in another type of polymer having the same classification in the UL 94 test. This is particularly the case for melamine cyanurate, effective in polyamides but ineffective in TPEs such as copolymers having polyamide blocks and polyether blocks, which do not withstand the first ignition in the UL 94 test as shown in Table 2 of EP2571939. The same problem is encountered with the phosphinic metal salts recently developed for effective flame retardance in polyamides subsequently classified as V0. When the same phosphinic metal salts are introduced into a TPE matrix, it is found that the TPE does not have a good classification in the UL 94 test. TPE creeps in the flame, giving rise to flaming drips from the first ignition, making it impossible to perform the second ignition of the UL 94 test. Materials of this type that creep (or flow) when a flame is applied cannot be used in the electrical and electrical engineering sectors, nor a fortiori in electrical safety.

To avoid these problems of creep and formation of flaming drips, it is known practice to incorporate into the material "anti-drip" additives such as PTFE, talc, mineral nanofillers of the organophilic modified clay type, or silicone agents. In the case of TPEs, not only are these anti-drip additives insufficient to go from the V2 classification to a V1 or V0 classification in the UL 94 test, but these additives also have the drawback of making the material more rigid and reducing elongation at break, thus modifying the characteristic mechanical properties of thermoplastic elastomers.

Polyamide-based TPE structures (TPE-As) are clearly more difficult to make flame retardant than "long-chain" polyamides, themselves more difficult to make flame retardant than "short-chain" polyamides or nylons. This difficulty leads to the use of larger amounts (20% to 35% by weight based on the total weight of the PA-based composition) of additives, which are most often phosphorus-containing and costly, which end up degrading other "performances" of the TPEs, especially as regards ductility, fluidity, elasticity, surface quality of extruded parts, water uptake, electrical insulation, and the variable costs of the formulation.

The object of the present invention is accordingly to provide flame-retardant polyamide-based thermoplastic elastomeric polymers (abbreviated as "TPE-As") that require little or no (not more than 10% by weight based on the total weight of the polymer composition) flame-retardant additives liable to degrade the mechanical properties of parts made from said TPE-As.

The object of the present invention is in particular to provide thermoplastic polymer compositions meeting at least the following 3 criteria:

do not comprise halogenated flame retardant, classified V0 or V1 in the UL 94 test, without creep or drip, and preferably have a Shore hardness within a range from 50 Shore A to 80 Shore D, preferably from 60 Shore A to 72 Shore D, measured in accordance with the standard ISO 868.

SUMMARY OF THE INVENTION

The applicant has now found a polyamide-based copolyesteramide that does not have the abovementioned drawbacks and that meets the above 3 criteria, by virtue of the incorporation of a phosphorus-containing diol by copolycondensation with said polyamide to be made flame retardant.

The present invention accordingly relates to a self-flame-retardant copolyesteramide, characterized in that it is obtained by polycondensation of at least one polyamide monomer with at least one phosphorus-containing diol. The phosphorus-containing diol is advantageously selected from: phosphine oxides, phosphinates, phosphonates, phosphates, phosphines, phosphites, phosphonites, phosphorites, phosphoranes and/or derivatives thereof.

The phosphorus-containing diol is preferably selected from one of the compounds of the following formulas:

(I)

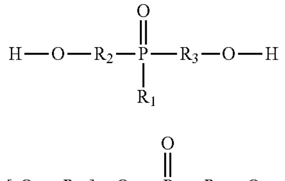

(II)

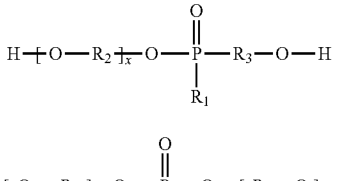

(III)

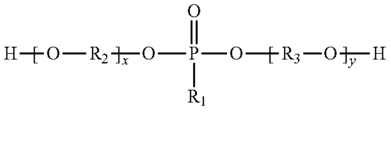

in which:

$R_1$ represents a methyl, ethyl, propyl, butyl or isobutyl group, or a group —[—O—$R_4$] in which $R_4$ represents a methyl, ethyl, propyl or butyl group, $R_2$ and $R_3$ are identical or different, preferably identical, and represent a methylene, ethylene or propylene group, and x and y are identical or different, preferably identical, and each represent a number from 1 to 10.

In a particular embodiment of the present invention, said phosphorus-containing diol is selected from oligomeric phosphonate diols of formula:

(III)

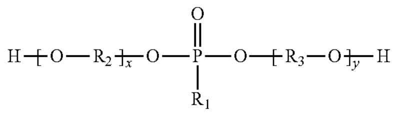

in which:

$R_1$ represents a methyl, ethyl or propyl group, $R_2$ and $R_3$ are identical or different and represent a methylene, ethylene or propylene group and x and y each represent a number from 1.2 to 1.9.

In this case it is preferable that $R_1$ represents a methyl group and x and y each represent a number from 1.5 to 1.7.

In another particularly advantageous embodiment of the present invention, the phosphorus-containing diol is selected from bis(hydroxyalkyl)phosphine oxides, for example isobutylbis(hydroxymethyl)phosphine oxide, isobutylbis(hydroxyethyl)phosphine oxide, or isobutylbis(hydroxypropyl)phosphine oxide (IHPO) of formula:

(IV)

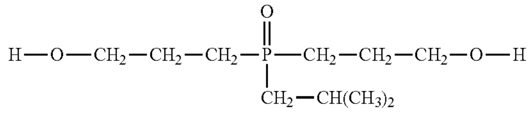

In the copolyesteramide of the invention, the polyamide monomer is advantageously selected from: 12, 11, 10.10, 6, 59, 510, 512, 513, 514, 516, 518, 536, 69, 610, 612, 613, 614, 616, 618, 636, 109, 1010, 1012, 1013, 1014, 1016, 1018, 1036, 10T, 129, 1210, 1212, 1213, 1214, 1216, 1218, 1236, 9T, 10T, 11T, 12T, and mixtures thereof.

The percentage by weight of atomic phosphorus in the copolymer is advantageously within a range from 0.1% to 10%, preferably from 0.2% to 5%, preferably between 0.5% and 3%, preferably between 0.5% and 2%, based on the total weight of copolyesteramide, which represents 100%.

The copolyesteramide of the invention advantageously further comprises at least one other constituent monomer of the polymer, in the form of another difunctional polymer block having terminal alcohol or amine functions. Said polymer is preferably selected from: polyether; polyester; polysiloxane, such as polydimethylsiloxane; polyolefin; polycarbonate; and mixtures thereof.

Said copolyesteramide preferably comprises a polyether diol, preferably selected from poly(ethylene glycol) (PEG), poly(1,2-propylene glycol) (PPG), polytetramethylene glycol (PTMG), polyhexamethylene glycol, poly(1,3-propylene glycol) (PO3G), poly(3-alkyltetrahydrofuran), in particular poly(3-methyltetrahydrofuran (poly(3MeTHF)), and mixtures thereof, the polyether diol preferably comprising PTMG.

In the case where the copolyesteramide of the invention comprises at least one other difunctional block aside from the polyamide block and the phosphorus-containing diol monomer, the percentage by weight of atomic phosphorus in the copolyesteramide is advantageously between 1% and 3%, preferably between 1% and 2%, based on the total weight of copolyesteramide, which represents 100%.

The present invention also relates to a process for synthesizing the copolyesteramide of the invention, as defined hereinabove, comprising the polycondensation of at least one polyamide precursor monomer with at least one phosphorus-containing diol, and optionally at least one other difunctional polymer block as defined hereinabove having terminal alcohol or amine functions.

The present invention further relates to a non-halogenated flame-retardant composition, characterized in that it comprises at least one copolyesteramide of the invention diluted in a thermoplastic polymer matrix. Said polymer matrix advantageously comprises at least one homopolymeric or copolymeric thermoplastic polymer selected from: polyolefins, polyamides, fluoropolymers, saturated polyesters, polycarbonate, styrene resins, PMMA, thermoplastic polyurethanes (TPUs), ethylene-vinyl acetate (EVA) copolymers, copolymers having polyamide blocks and polyether blocks, copolymers having polyester blocks and polyether blocks, copolymers having polyamide blocks, polyether blocks, and polyester blocks, copolymers of ethylene and an alkyl (meth)acrylate, copolymers of ethylene and vinyl alcohol (EVOH), ABS, SAN, ASA, polyacetal, polyketones, and mixtures thereof.

Said composition advantageously comprises from 1% to 99% by weight of said copolyesteramide of the invention and from 1% to 99% by weight of said polymer matrix, based on the total weight of the composition, which represents 100%.

The composition of the invention advantageously does not contain a flame-retardant additive, the sole flame-retardant effect being provided by the copolyesteramide itself.

Alternatively, the composition of the invention further comprises at least one flame-retardant additive, preferably in an amount of less than 10%, preferably less than 5%, added by physical mixing, preferably by compounding, and selected from: hydrated fillers of the aluminum trihydroxide and/or magnesium dihydroxide type, melamine derivatives, phosphorus-containing flame retardants, in particular selected from metal salts of phosphinic acid, metal salts of diphosphinic acid, and mixtures thereof.

The present invention also relates to the use of a copolyesteramide or of a composition of the invention for the manufacture of electrical articles and/or articles for electrical engineering, tubes, cables, electrical safety articles, molded articles and/or articles obtained by 3D printing.

The present invention further relates to an article obtained by injection molding, extrusion, coextrusion, hot compression molding, multi-shot injection molding or by 3D printing, from at least one copolyesteramide or from a composition of the invention.

DETAILED DESCRIPTION OF THE INVENTION

In the present description, it is noted that when reference is made to ranges, expressions of the type "within a range from . . . to . . . " or "including/comprising from . . .

to . . . " include the limits of the range. Conversely, expressions of the type "between . . . and . . . " exclude the limits of the range.

Unless otherwise mentioned, the percentages expressed are mass percentages. Unless otherwise mentioned, the parameters to which reference is made are measured at atmospheric pressure and ambient temperature (20-25° C., generally 23° C.).

The invention is now described in detail and in a non-limiting manner in the description that follows.

The polymer of the invention is "self-flame-retardant", by virtue of its internal phosphorus content in the polymer chain. It is a copolyesteramide resulting from the direct reaction, by polycondensation, of at least one polyamide monomer and at least one phosphorus-containing diol, and not obtained by compounding (physical mixing) of polyamide with any flame-retardant additive.

The composition has in the context of the present invention been observed to have not only good flame-retardant properties, but also good mechanical properties, for example good ductility and good impact resilience.

The phosphorus-containing diol is advantageously selected from: phosphine oxides, phosphinates, phosphonates, phosphates, phosphines, phosphites, phosphonites, phosphorites, phosphoranes and/or derivatives thereof.

The phosphorus-containing diol is preferably selected from one of the compounds of the following formulas:

(I)

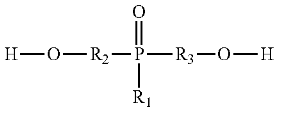

(II)

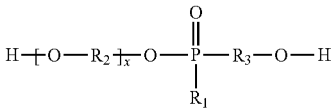

(III)

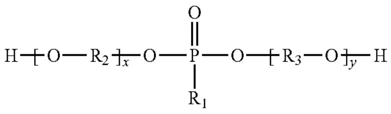

in which:

$R_1$ represents a methyl, ethyl, propyl, butyl or isobutyl group, or a group —[—O—$R_4$] in which $R_4$ represents a methyl, ethyl, propyl or butyl group, $R_2$ and $R_3$ are identical or different and represent a methylene, ethylene or propylene group, and x and y are identical or different and each represents a number from 1 to 10.

In a particular embodiment of the present invention, said phosphorus-containing diol is selected from oligomeric phosphonate diols of formula:

(III)

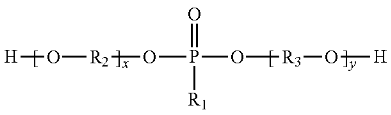

in which:

$R_1$ represents a methyl, ethyl or propyl group, $R_2$ and $R_3$ are identical or different and represent a methylene, ethylene or propylene group and x and y each represent a number from 1.2 to 1.9.

In this case it is preferable that $R_1$ represents a methyl group and x a number from 1.5 to 1.7.

In another particularly advantageous embodiment of the present invention, the phosphorus-containing diol is selected from bis(hydroxyalkyl)phosphine oxides, for example isobutylbis(hydroxymethyl)phosphine oxide, isobutylbis(hydroxyethyl)phosphine oxide, or isobutylbis(hydroxypropyl)phosphine oxide (IHPO) of formula:

(IV)

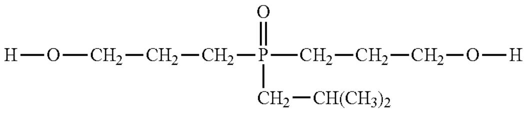

It is possible to advantageously use three types of polyamide monomer.

Three types of polyamide may be employed in the composition of said PA precursors.

In a first type, the polyamide monomers consist of:

at least one dicarboxylic acid X (aliphatic, cycloaliphatic or aromatic), selected in particular from those having from 4 to 36 carbon atoms, preferably those having from 6 to 18 carbon atoms, and at least one diamine Y (aliphatic, cycloaliphatic or aromatic) selected in particular from those having from 2 to 36 carbon atoms, preferably those having from 6 to 12 carbon atoms.

Examples of aliphatic diacids are butanedioic, adipic, suberic, azelaic, sebacic, dodecanedicarboxylic, myristic, tetradecanedicarboxylic, hexadecanedicarboxylic, octadecanedicarboxylic, and dimerized fatty acids.

An example of a cycloaliphatic diacid that may be mentioned is 1,4-cyclohexanedicarboxylic acid.

Examples of aromatic diacids that may be mentioned are terephthalic acid (T), isophthalic acid (I), and the sodium, potassium or lithium salt of 5-sulfoisophthalic acid.

Examples of aliphatic diamines that may be mentioned are tetramethylenediamine, hexamethylenediamine, decamethylene-1,10-diamine, dodecamethylenediamine, trimethylhexamethylenediamine.

Examples of cycloaliphatic diamines that may be mentioned are the isomers of bis(4-aminocyclohexyl)methane (BACM or PACM), bis(3-methyl-4-aminocyclohexyl)methane (BMACM or MACM), and 2,2-bis(3-methyl-4-aminocyclohexyl)propane (BMACP), isophoronediamine (IPDA), 2,6-bis(aminomethyl)norbornane (BAMN), and piperazine (Pip).

The copolyesteramide of the invention advantageously comprises at least one XY type monomer selected from: 59, 510, 512, 513, 514, 516, 518, 536, 69, 610, 612, 613, 614, 616, 618, 636, 109, 1010, 1012, 1013, 1014, 1016, 1018, 1036, 10T, 129, 1210, 1212, 1213, 1214, 1216, 1218, 1236, 9T, 10T, 11T, 12T, and mixtures thereof.

In a second type, the polyamide monomers comprise one or more α,ω-aminocarboxylic acids and/or one or more lactams Z having from 6 to 12 carbon atoms, in the presence of a dicarboxylic acid having from 4 to 36 carbon atoms.

Examples of lactams that may be mentioned are caprolactam, enantholactam, and laurolactam.

Examples of α,ω-aminocarboxylic acids that may be mentioned are aminocaproic acid, 7-aminoheptanoic acid, 11-aminoundecanoic acid, and 12-aminododecanoic acid.

The polyamide monomers of the second type advantageously consist of amino 11, 12 or 6.

In a third type, the polyamide monomers consist of at least one monomer of the first type XY and at least one monomer of the second type Z. In other words, the polyamide monomers result from the condensation of at least one α,ω-aminocarboxylic acid (or a lactam) with at least one diamine and one dicarboxylic acid.

In this case, the mixtures consist of:

one or more aliphatic, cycloaliphatic or aromatic diamines having X carbon atoms;

one or more dicarboxylic acids having Y carbon atoms; which forms the monomer XY, and one or more comonomers Z, selected from lactams and α,ω-aminocarboxylic acids having Z carbon atoms;

in the presence of a chain limiter selected from dicarboxylic acids or diamines or of an excess of diacid or diamine used as structural unit.

It is advantageous to use as chain limiter the dicarboxylic acid having Y carbon atoms, which is introduced in excess with respect to the stoichiometry of the diamine(s).

In another variant, the polyamide monomers comprise at least two different α,ω-aminocarboxylic acids or at least two different lactams having from 6 to 12 carbon atoms or a lactam and an aminocarboxylic acid having a nonidentical number of carbon atoms, optionally in the presence of a chain limiter.

The standard NF EN ISO 1874-1:2011 defines a nomenclature for polyamides. In the present description, the term "monomer" should be taken as meaning "repeat unit". A special case is where a repeat unit of the polyamide consists of the combination of a diacid with a diamine. Here, it is the combination of a diamine and diacid, that is to say the "diamine-diacid" or "XY" pair, in equimolar amounts, that is considered to correspond to the monomer.

The rationale for this is that the diacid or diamine is individually merely a structural unit that is unable to polymerize on its own.

Examples of polyamides are those formed by the following monomer mixtures:

formula 6/12, in which 6 denotes caprolactam and 12 denotes laurolactam.

11/12, in which 11 denotes 11-aminoundecanoic acid and 12 denotes laurolactam.

6/11, in which 6 denotes caprolactam and 11 denotes 11-aminoundecanoic acid.

6/66, in which 6 denotes caprolactam and 66 denotes a monomer resulting from the condensation of hexamethylenediamine with adipic acid.

Further examples that may be mentioned are the mixtures 1010/11, 610/11, 1012/11, 1010/11/12, 610/1010/11, 610/612/11, 610/612/1010, 11/636, 11/1036, and 1010/1036.

In the copolyesteramide of the invention, said at least one polyamide monomer is advantageously selected from: 12, 11, 10.10, 6, 59, 510, 512, 513, 514, 516, 518, 536, 69, 610, 612, 613, 614, 616, 618, 636, 109, 1010, 1012, 1013, 1014, 1016, 1018, 1036, 10T, 129, 1210, 1212, 1213, 1214, 1216, 1218, 1236, 9T, 10T, 11T, 12T, and mixtures thereof.

In a particular embodiment of the invention, the copolyesteramide further comprises, in addition to the polyamide monomer and the phosphorus-containing diol, at least one other oligomer, generally having terminal alcohol (diol) or optionally amine (diamine) functions, preferably a polymer diol, and in particular in the form of a diol polymer block.

In this case in particular, the copolyesteramide of the invention then forms a polyamide-based thermoplastic elastomer (abbreviated as TPE-A) comprising a diol polymer. The latter generally forms a flexible or soft block in the copolyesteramide of the invention. Said block is said to be "flexible" because it has a low glass transition temperature (Tg). Low glass transition temperature is understood as meaning a glass transition temperature Tg of less than 15° C., preferably of less than 0° C., advantageously of less than −15° C., more advantageously still of less than −30° C., optionally of less than −50° C.

The number-average molar mass Mn of the diol polymers, optionally in the form of flexible blocks, according to the invention is within a range from 250 to 5000 g/mol, preferably from 250 to 3000 g/mol, and more preferably from 500 to 2000 g/mol.

Said difunctional, preferably diol, polymer according to the invention is in particular selected from polyether, polyester, polysiloxane, such as blocks of polydimethylsiloxane or PDMS, polyolefin, polycarbonate, and mixtures thereof.

Polyether (hereinafter abbreviated as PE) is for the purposes of the invention understood as meaning polyoxyalkylenes such as polyalkylene ether polyols, in particular polyalkylene ether diols. The PE blocks in the copolymer of the invention comprise at least one molecule selected from poly(ethylene glycol) (PEG), poly(1,2-propylene glycol) (PPG), polytetramethylene glycol (PTMG), polyhexamethylene glycol, poly(1,3-propylene glycol) (PO3G), poly(3-alkyltetrahydrofuran), in particular poly(3-methyltetrahydrofuran (poly(3MeTHF)), and mixtures thereof. It is also possible to consider a PE of alternating, statistical or block "copolyether" type, comprising a chain of at least two of the PE types mentioned above.

The polyethers may also comprise PEs obtained by oxyethylation of bisphenols, such as for example bisphenol A. These latter products are described in patent EP 613 919.

The polyethers may also comprise ethoxylated primary amines. Examples of ethoxylated primary amines are the products of formula:

$$H{-}(OCH_2CH_2)_m{-}\underset{\underset{CH_3}{|}}{\underset{(CH_2)_x}{\overset{|}{N}}}{-}(CH_2CH_2O)_n{-}H$$

in which m and n are between 1 and 20 and x is between 8 and 18. These products are commercially available under the Noramox® brand from CECA and under the Genamin® brand from Clariant.

The chain ends of the PE blocks can thus be di-OH, di-$NH_2$, diisocyanate or diacid, according to their process of synthesis. For the invention, the PEs used are advantageously di-OH.

The PE in the copolyesteramide of the invention is advantageously a soft block (SB) comprising tetramethylene glycol units. The SB block is preferably a PTMG block.

It is also possible to consider a polyether block that is a copolymer in which the majority monomer is ethylene oxide. In this case, the ethylene oxide preferably represents more than 50% by weight based on the total weight of the copolymer.

Polyester (hereinafter abbreviated as PES) is for the purposes of the invention understood as meaning polyesters customarily produced by polycondensation between a dicarboxylic acid and a diol. Suitable carboxylic acids include those mentioned above used to form the polyamide blocks, with the exception of aromatic acids such as terephthalic and isophthalic acid. Suitable diols include linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl)cyclohexane, and 1,4-cyclohexanedimethanol.

The term “polyesters” is also understood as meaning poly(caprolactone) and PESs based on fatty acid dimers, in particular products of the Priplast® range from Croda.

It is also possible to consider a PES of alternating, statistical or block “copolyester” type, comprising a chain of at least two of the PES types mentioned above.

The term polysiloxane (hereinafter abbreviated as PSi) is for the purposes of the invention understood as meaning any organosilicon polymer or oligomer of linear or cyclic, branched or crosslinked structure, obtained by polymerization of functionalized silanes, and consisting essentially of a repetition of main units in which silicon atoms are linked to one another via oxygen atoms (siloxane linkage —Si—O—Si—), with optionally substituted hydrocarbon radicals directly attached via a carbon atom to said silicon atoms. The most common hydrocarbon radicals are alkyl radicals, in particular C1-C10 radicals and especially methyl, fluoroalkyl radicals, aryl radicals and especially phenyl, and alkenyl radicals and especially vinyl; other types of radical that may be attached to the siloxane chain, either directly or via a hydrocarbon radical, are in particular hydrogen, halogens and especially chlorine, bromine or fluorine, thiols, alkoxy radicals, polyoxyalkylene (or polyether) radicals and especially polyoxyethylene and/or polyoxypropylene, hydroxyl or hydroxyalkyl radicals, substituted or unsubstituted amine groups, amide groups, acyloxy or acyloxyalkyl radicals, hydroxyalkylamino or aminoalkyl radicals, quaternary ammonium groups, amphoteric or betaine groups, anionic groups such as carboxylates, thioglycolates, sulfosuccinates, thiosulfates, phosphates, sulfates and mixtures thereof, this list of course being in no way exhaustive (“organomodified” silicones).

The polysiloxane preferably comprises polydimethylsiloxane (hereinafter abbreviated as PDMS blocks), polymethylphenylsiloxane and/or polyvinylsiloxane.

The term polyolefin (hereinafter abbreviated as PO block) is for the purposes of the invention understood as meaning any polymer comprising an α-olefin as monomer, i.e. homopolymers of an olefin or copolymers of at least one α-olefin and at least one other copolymerizable monomer, the α-olefin advantageously containing from 2 to 30 carbon atoms.

Examples of α-olefins that may be mentioned are ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene, and 1-triacontene. These α-olefins may be used alone or as a mixture of two or more than two.

Examples that may be mentioned include:

- ethylene homopolymers and copolymers, especially low-density polyethylene (LDPE), high-density polyethylene (HDPE), linear low-density polyethylene (LLDPE), very-low-density polyethylene, (VLDPE), and polyethylene obtained by metallocene catalysis,
- propylene homopolymers and copolymers,
- essentially amorphous or atactic poly-α-olefins (APAO),
- ethylene/α-olefin copolymers such as ethylene/propylene, EPR (ethylene-propylene rubber) and EPDM (ethylene-propylene-diene) elastomers, and mixtures of polyethylene with an EPR or an EPDM,
- styrene/ethylene-butene/styrene (SEBS), styrene/butadiene/styrene (SBS), styrene/isoprene/styrene (SIS), and styrene/ethylene-propylene/styrene (SEPS) block copolymers,
- copolymers of ethylene with at least one product selected from salts or esters of unsaturated carboxylic acids, such as for example alkyl (meth)acrylates, the alkyl possibly containing up to 24 carbon atoms, vinyl esters of saturated carboxylic acids, such as for example vinyl acetate or propionate, and dienes, such as for example 1,4-hexadiene or polybutadiene.

In an advantageous embodiment of the invention, the polyolefin comprises polyisobutylene and/or polybutadiene.

In a particularly advantageous embodiment, the copolyesteramide of the invention comprises at least one flexible polyolefin block (PO block) and at least one hydrophilic hard block (hereinafter abbreviated as hHB) comprising both polyamide and polyether, such as a polyether amide block, a polyether ester amide block and/or a polyether amide imide block, etc. Said PO block preferably comprises a polyolefin containing terminal acid, alcohol or amine groups, preferably terminal alcohol (diol) groups.

The term polycarbonate (hereinafter abbreviated as PC block) is for the purposes of the invention more particularly understood as meaning any aliphatic polycarbonate. Aliphatic polycarbonates are described for example in documents DE2546534 and JP1009225. Such homopolymeric or copolymeric polycarbonates are also described in US471203. Patent applications WO 92/22600 and WO 95/12629 describe copolymers comprising polycarbonate blocks and also processes for the synthesis thereof. The blocks (and synthesis thereof) described in these documents are perfectly feasible for the synthesis of a PC block copolyesteramide according to the invention. The polycarbonate blocks in the copolyesteramide of the invention preferably have the formula:

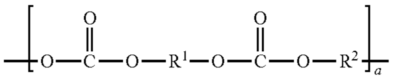

in which a is an integer from 2 to 300; $R^1$ and $R^2$, which may be identical or different, represent a straight or branched, aliphatic or alicyclic chain having from 2 to 18 carbon atoms, or represent a polyoxyalkylene group, or represent a polyester group.

Preference is given to polycarbonates in which $R^1$ and $R^2$ are selected from hexylene, decylene, dodecylene, 1,4-cyclohexylene, 2,2-dimethyl-1,3-propylene, 2,5-dimethyl-2,5-hexylene or polyoxyethylene groups.

When the copolyesteramides comprise at least one polyamide (optionally in the form of a rigid polyamide block), at least one phosphorus-containing diol, and optionally at least one other polymer (in particular in the form of a flexible block), it is self-evident that the present invention does in fact encompass all copolyesteramides comprising two, three, four (or even more) different blocks selected from those described in the present description, as long as at least one of these blocks is a polyamide block and has reacted with a phosphorus-containing diol to form an ester linkage.

A copolyesteramide is for the purposes of the invention a polymer comprising at least one polyamide precursor monomer and a phosphorus-containing diol.

The percentage by weight of atomic phosphorus in the copolymer is advantageously within a range from 0.1% to 10%, preferably from 0.2% to 5%, preferably between 0.5% and 3%, preferably between 0.5% and 2%, based on the total weight of copolyesteramide, which represents 100%, this optimizing the results of the UL 94 test obtained for the self-flame-retardant copolyesteramide of the invention.

The copolyesteramide of the invention may further comprise another polymer (such as PE).

In the case where the copolyesteramide of the invention comprises at least one other difunctional block aside from the polyamide precursor monomer, the percentage by weight of atomic phosphorus in the copolyesteramide is between 1% and 3%, preferably between 1% and 2%, based on the total weight of copolyesteramide representing 100%. This gives the best results in the UL 94 test for the self-flame-retardant copolyesteramide of the invention.

The present invention also provides a process for synthesizing the copolyesteramide of the invention, as defined hereinabove, comprising the polycondensation of at least one polyamide monomer with at least one phosphorus-containing diol, and optionally at least one other difunctional polymer block as defined hereinabove having terminal alcohol or amine functions.

The process for synthesizing a copolyesteramide of the invention utilizes any means that permits copolymerization of the polyamide monomers with the phosphorus-containing diol, and optionally with said soft blocks. A number of means may be considered: in solution, in the bulk or via an interfacial technique, or even by combining a plurality of these methods, as described in chapter 9 of the Handbook of Condensation Thermoplastic Elastomers (edited by Stoyko Fakirox, Wiley-VCH, Weinheim, 2005).

The copolyesteramides result from the polycondensation of polyamide monomers with phosphorus-containing diols and with soft blocks SB of polymer (e.g. polyether) having alcohol chain ends.

In practice, the process for the copolymerization of polyamide monomers with SBs and phosphorus-containing diols is carried out either in two main steps or in a single main step. Whether in one or two steps, it is advantageous to operate in the presence of a catalyst. The term "catalyst" is understood as meaning any product that makes it possible to accelerate the formation of ester linkages. The esterification catalyst is advantageously a derivative of a metal selected from the group formed by titanium, zirconium, and hafnium or else a strong acid such as phosphoric acid or boric acid. The catalysts described in the following patents may be used: U.S. Pat. Nos. 4,331,786, 4,115,475, 4,195,015, 4,839,441, 4,864,014, 4,230,838 et 4,332,920, WO 04 037898, EP 1262527, EP 1270211, EP 1136512, EP 1046675, EP 1057870, EP 1155065, EP 506495, and EP 504058.

In a first embodiment, the process of the invention comprises two main steps. In a first step (I), only the polyamide monomers undergo polymerization, and in a second step (II), said at least one PA is reacted with at least one phosphorus-containing diol and optionally also with a diol polymer (SB block), preferably in the presence of a catalyst and under reduced pressure.

Said step (I) may comprise any means known to those skilled in the art for producing polyamide (blocks), for example by a polycondensation reaction between polyamide precursors and a dicarboxylic acid or diamine as chain regulator. In this case, step I is divided into several substeps:

(I-1) charging a reactor (for example an autoclave) with a mixture comprising at least one PA precursor and at least one chain regulator, such as a diacid.

Said chain regulator is preferably selected from adipic acid, sebacic acid, terephthalic acid, isophthalic acid, and mixtures thereof;

(I-2) phase of heating said mixture to a temperature within a range from 180 to 350° C., preferably from 200 to 300° C., preferably from 230 to 290° C.;

Water may optionally be added to the mixture to improve thermal conduction and/or to achieve a sufficient pressure, in particular for ring-opening of lactam 12, for example.

(I-3) hot isothermal phase, during which the temperature of the mixture is kept constant, this being within a range from 180 to 350° C., preferably from 200 to 300° C., preferably from 230 to 290° C., for a time sufficient to bring all the materials introduced in I-1 to a fluid state, that is to say a state of sufficiently low viscosity for there to be a homogeneous mixture;

The duration of the hot isothermal phase is generally within a range from 15 minutes to 5 hours, preferably from 30 minutes to 4 hours, preferably from 30 minutes to 3 hours.

During this hot isothermal phase, a pressure of, for example, between 1 and 40 bar develops in the reactor. The pressure preferably does not exceed 30 bar, but this maximum pressure does in fact depend on the reactor and on the way in which it is constructed.

(I-4) phase of removing water, by expansion (reduction in pressure) of said mixture during which the mixture returns to atmospheric pressure, and/or by distillation. This is the water optionally added during phase I-1, I-2 and/or I-3 or water formed during these phases; then (I-5) purging with inert gas until complete polymerization of the mixture in the form of polyamide blocks.

The purge time may be within a range from a few minutes to a few hours, preferably from 5 minutes to 5 hours, preferably from 30 minutes to 3 hours, preferably from 1 hour to 2 hours.

Step I may further comprise one or more of the following substeps:

(I-6) optional step of maintaining under reduced pressure, for example less than 500 mbar, preferably less than 100 mbar, to increase the yield of the polymerization if necessary.

(I-7) optional step of collecting the PAs.

All the starting materials necessary for the formation of the PA may be loaded into the reactor at the start in the order that those skilled in the art deem appropriate, as is the case for example during step I-1 of the process described above by way of example, but it is of course possible to consider introducing one or more starting materials during any of substeps I-1 to I-7.

The temperature for this main step I is within a range from 180 to 350° C., preferably from 200 to 300° C., or better still from 230 to 290° C.

Said PA may be extruded for subsequent use, stored in the reactor or transferred to another reactor, for the performance of step II described below.

Step (II) comprises the following substep(s):

(II-1) contacting, in a reactor, of at least one portion of the amount of at least one phosphorus-containing diol, and optionally of at least one soft block SB, with the PAs formed in step 1, and adjusting the temperature of the resulting mixture if necessary, so that the temperature thereof is within a range from 180 to 350° C., preferably from 200 to 300° C., preferably from 200 to 260° C.;

(II-2) optional step of purging with nitrogen (or with another inert gas) and/or under slightly reduced pressure, for example less than 500 mbar, preferably less than 100 mbar, so as to remove the water that forms in the reactor during the copolymerization;

(II-3) optional step of introducing the remaining portion of said at least one block SB as appropriate.

The temperature and duration of each step can be easily adjusted by those skilled in the art so as to optimize polycondensation reactivity while minimizing side reactions. The temperature for this main step II is likewise within a range from 180 to 350° C., preferably from 200 to 300° C., or better still from 200 to 260° C.

In a second embodiment, the process of the invention comprises a single main step characterized in that said at least one phosphorus-containing diol, and optionally said "other polymer" (soft block), are introduced directly during the main step I, in the same way as the starting materials needed for formation of the PA, that is to say during any of intermediate steps I-1 to I-7. In this embodiment, the main steps I and II are in fact carried out simultaneously, hence saving time, whereas, in the embodiment in two main steps, steps I and II are carried out successively.

Irrespective of the embodiment thereof (in one step or in two steps), the process of the invention comprises a final step III of finishing and collecting a copolyesteramide. This step III comprises at least two substeps:

(III-1) adjusting the viscosity of the copolyesteramide obtained: the pressure in the reactor is reduced under high vacuum until the desired viscosity, that is to say the desired molar mass for the copolymer, is achieved. "Desired molar mass" is understood as meaning a number-average molar mass within a range from 5000 to 100,000 g/mol, preferably within a range from 15,000 to 50,000 g/mol, preferably within a range from 10,000 g/mol to 40,000 g/mol. The pressure during this substep is preferably less than 100 mbar, preferably less than 50 mbar, preferably less than 10 mbar, more preferably less than 1 mbar.

The increase in the molar mass of the copolymer, and therefore in the viscosity of the medium, is for example determined by measuring the change in the value of the torque exerted by the molten polymer on the stirrer or else by measuring the electrical power consumed by the stirrer for a given stirring speed.

(III-2) extruding and collecting said copolyesteramide, for example in the form of pellets or in any other form.

(III-3) optional step of baking the pellets to reduce the residual moisture content below 0.1% by weight.

The stirring speed in each step is optimized according to the rheology of the medium and the nature of the stirrer.

The reduction in pressure may be effected gradually or in a stepwise manner. The extent of the maximum reduction in pressure depends on the nature of the species present, the hydrophilicity or hydrophobicity thereof, and the reactivity thereof.

A catalyst may be added during one of steps I and/or II, preferably during one of substeps II, for a catalyst sensitive to hydrolysis.

The present invention further provides a non-halogenated flame-retardant composition, characterized in that it comprises at least one copolyesteramide of the invention diluted in a thermoplastic polymer matrix. Said polymer matrix advantageously comprises at least one homopolymeric or copolymeric thermoplastic polymer selected from: polyolefins, polyamides, fluoropolymers, saturated polyesters, polycarbonate, styrene resins, PMMA, thermoplastic polyurethanes (TPUs), ethylene-vinyl acetate (EVA) copolymers, copolymers having polyamide blocks and polyether blocks, copolymers having polyester blocks and polyether blocks, copolymers having polyamide blocks, polyether blocks, and polyester blocks, copolymers of ethylene and an alkyl (meth)acrylate, copolymers of ethylene and vinyl alcohol (EVOH), ABS, SAN, ASA, polyacetal, polyketones, and mixtures thereof.

Said composition advantageously comprises from 1% to 99% by weight of said copolyesteramide of the invention and from 1% to 99% by weight of said polymer matrix, based on the total weight of the composition, which represents 100%.

The composition of the invention advantageously does not contain a flame-retardant additive, the sole flame-retardant effect being provided by the copolyesteramide itself.

Alternatively, the composition of the invention further comprises at least one flame-retardant additive, preferably in an amount of less than 10%, preferably less than 5%, added by physical mixing, preferably by compounding, and selected from: hydrated fillers of the aluminum trihydroxide and/or magnesium dihydroxide type, melamine derivatives, phosphorus-containing flame retardants, in particular selected from metal salts of phosphinic acid, metal salts of diphosphinic acid, and mixtures thereof.

The present invention also relates to the use of a copolyesteramide or of a composition of the invention for the manufacture of electrical articles and/or articles for electrical engineering, tubes, cables, electrical safety articles, molded articles and/or articles obtained by 3D printing.

The present invention further relates to an article obtained by injection molding, extrusion, coextrusion, hot compression molding, multi-shot injection molding or by 3D printing, from at least one copolyesteramide or from a composition of the invention.

EXAMPLES

Products used in the Tests

Phosphorus-Containing Monomers

RF1: Isobutylbis(hydroxypropyl)phosphine oxide (IHPO)

RF2: Oligomeric phosphonate polyol (OP560) of formula:

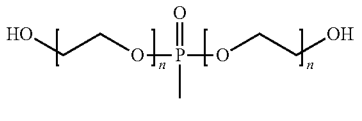

Polyamide Monomers

A11 is 11-aminoundecanoic acid for production of a prepolymer of Mn: 1000 g/mol. DC6 is adipic acid used as a chain limiter For the Tests with Flexible Block PTMG 1000: Polytetramethylene glycol (Mn: 1000 g/mol)

Preparation of Flame-Retardant Materials

A glass reactor is charged with 11-aminoundecanoic acid, adipic acid, polytetramethylene glycol (optional), and the phosphorus-containing compound in the proportions described in Table 2. The mixture is inertized by purging with nitrogen, and heated to a material temperature of 235° C. while stirring. The polymerization takes place under nitrogen purging, an increase in stirring torque being observed. If a polyether is present, it is necessary to work under reduced pressure and add a catalyst (zirconium butoxide type).

UL 94 test: This standardized test is performed out on a set of 5 identical specimens (127 mm×12.7 mm×1.6 mm). The samples are suspended from a support. These are ignited from below with a blue Bunsen burner flame 20 mm in height. The flame is applied for 10 seconds and then withdrawn. T1, the period of time during which combustion (combustion with flame then glowing combustion) persists, is recorded. The flame is then reapplied for a period of 10 seconds and then withdrawn. The period of time T2 during which combustion persists is recorded in the same way. The phenomenon of afterglow is taken into account, as is the possibility of flaming drips liable to propagate the fire falling onto cotton placed directly beneath the test bar.

TABLE 1

| UL 94 classification | | | |
|---|---|---|---|
| Classification criteria | V0 | V1 | V2 |
| Number of specimens burnt | 5 | 5 | 5 |
| Number of combustions | 2 | 2 | 2 |
| Duration of combustion after first flame | <10 s | <30 s | <30 s |
| Total duration of combustion for the 5 samples and for the 2 combustions | <50 s | <250 s | <250 s |
| Duration of glowing combustion persisting after 2nd flame | <30 s | <60 s | <60 s |
| Flaming drips igniting the cotton | No | No | Yes |
| Support burnt | No | No | No |

In Table 2 below, "NC" denotes not classified, for a material having no fire resistance.

DSC Conditions

Apparatus: DSC TA Q2000 with Intracooler cooling module

Ramp of 20° C./min up to 240° C.

Ramp of 20° C./min down to −80° C.

Ramp of 20° C./min up to 240° C.

Viscosity

The viscosity in solution is measured in meta-cresol in accordance with the standard ISO 307

Test Results

TABLE 2

| Results | | | | | | | | | |
|---|---|---|---|---|---|---|---|---|---|
| Test reference | % A11 | % DC6 | % RF | % PTMG | RF | % P | Viscosity | Tm (° C.) | UL 94 |
| CP1 | 100.0 | — | — | | / | 0 | 1.3 | 185 | NC |
| Ex1 | 94.1 | 2.4 | 3.6 | | RF1 | 0.5 | 1.1 | 183 | NC |
| Ex2 | 82.1 | 4.7 | 7.2 | | RF1 | 1 | 1.1 | 176 | V2 |
| Ex3 | 90.9 | 2.4 | 6.8 | | RF2 | 0.79 | 0.9 | 179 | V0 |
| Ex4 | 81.8 | 4.7 | 13.5 | | RF2 | 1.58 | 0.8 | 166 | V0 |
| Ex5 | 93.4 | 2.4 | 4.3 | | RF2 | 0.5 | 1 | 179 | V2 |
| CP2 | 43.3 | 6.7 | | 50.0 | | | 1.3 | 153 | NC |
| Ex6 | 39.0 | 9.1 | 3.6 | 48.3 | RF1 | 0.5 | 1.3 | 143 | NC |
| Ex7 | 39.0 | 11.0 | 42.8 | 7.2 | RF1 | 1 | 1.2 | 133 | V2 |
| Ex8 | 37.2 | 12.8 | 39.3 | 10.8 | RF1 | 1.5 | 1.2 | 120 | V2 |
| Ex9 | 41.0 | 9.0 | 45.7 | 4.3 | RF2 | 0.5 | 1.1 | / | V2 |
| Ex10 | 40.0 | 10.1 | 36.5 | 13.5 | RF2 | 0.79 | 0.6 | 129 | V2 |
| Ex11 | 41.3 | 8.7 | 43.3 | 6.8 | RF2 | 1.58 | 1.0 | 141 | V0 |
| Ex12 | 47.3 | 8.3 | 29.0 | 7.2 | RF1 | 1 | 1.1 | 149 | V2 |
| Ex13 | 52.1 | 10.9 | 26.3 | 10.8 | RF1 | 1.5 | 1.0 | 149 | V2 |

Without Flexible Block

The best results in the UL 94 test are obtained for the self-flame-retardant copolyesteramides in inventive examples 3 and 4, using the phosphorus-containing monomer RF2, and in which the percentage by weight of atomic phosphorus in the copolymer (% P) is between 0.5% and 2% (0.79% for example 3 and 1.58% for example 4) based on the total weight of copolyesteramide, which represents 100%.

With Flexible Block

The best result in the UL 94 test is obtained for the self-flame-retardant copolyesteramide in inventive example 11, using the phosphorus-containing monomer RF2, and in which the percentage by weight of atomic phosphorus in the copolymer is between 1% and 2% (1.58% for example 11) based on the total weight of copolymer, which represents 100%.

To sum up, the polymer of the invention allows savings in the production costs of the flame-retardant material, since flame-retardant additives are used in smaller amounts or are even absent altogether thus eliminating the step of compounding the polymer with such an additive.

TABLE 3

| Test reference | Ex3 | CP3 |
|---|---|---|
| Composition | % A11: 90.9, % DC6: 2.4, % RF2: 6.8 | % Lactam12: 92.4, % DC6: 2.8, % PTMG (Mn: 250 g/mol): 4.8 |
| % P | 0.79 | 0 |
| UL 94 | V0 | NC |
| Charpy impact (23° C.) | 100% breakage | 100% breakage |
| Breakage type | 11.7 [1.8] | 6.7 [0.2] |
| Resilience (kJ/m$^3$) [EC] | | |

Charpy impact tests were carried out on the copolyesteramide from example 3 (Ex 3) and on a PA12-PTMG copolymer (CP3), which have a similar hardness (~70 shD).

The tests were carried out at 23° C. in accordance with the standard ISO 179 1eA on dry samples (drying protocol: overnight at 60° C.). The test specimens (80 mm×10 mm×4 mm) were injection molded in an Xplore IM 12 press coupled with an Xplore MC 15 twin-screw micro-extruder. The self-flame-retardant copolyesteramide from inventive example 3, using the phosphorus-containing monomer RF2 and in which the percentage by weight of atomic phosphorus in the copolymer based on the total weight of copolyesteramide is 0.79%, is more resilient in the impact test than the non-flame-retardant copolyesteramide CP3 and gives the best results in the UL 94 test.

The products were melted and homogenized in an Xplore Micro 5C micro-extruder and shaped in the coupled micro-injector.

The invention claimed is:

1. A self-flame-retardant copolyesteramide, wherein it is obtained by polycondensation of at least one polyamide monomer with at least one phosphorus-containing diol, wherein the phosphorus-containing diol is selected from oligomeric phosphonate diols of formula:

(III)

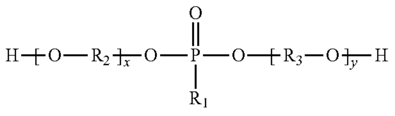

in which:

$R_1$ represents a methyl, ethyl, propyl, butyl or isobutyl group, or a group —[—O—$R_4$] in which $R_4$ represents a methyl, ethyl, propyl or butyl group, $R_2$ and $R_3$ are identical or different and represent a methylene, ethylene or propylene group, and x and y are identical or different and each represent a number from 1 to 10.

2. The copolyesteramide as claimed in claim 1, wherein $R_1$ represents a methyl, ethyl or propyl group, $R_2$ and $R_3$ are identical or different and represent a methylene, ethylene or propylene group and x and y each represent a number from 1.2 to 1.9.

3. The copolyesteramide as claimed in claim 2, wherein $R_1$ represents a methyl group and x and y each represent a number from 1.5 to 1.7.

4. The copolyesteramide as claimed in claim 1, wherein said at least one polyamide monomer is selected from the following polyamide monomers: 12, 11, 6, 59, 510, 512, 513, 514, 516, 518, 536, 69, 610, 612, 613, 614, 616, 618, 636, 109, 1010, 1012, 1013, 1014, 1016, 1018, 1036, 10T, 129, 1210, 1212, 1213, 1214, 1216, 1218, 1236, 9T, 10T, 11T, 12T, and mixtures thereof.

5. The copolyesteramide as claimed in claim 1, wherein the percentage by weight of atomic phosphorus in the copolymer is within a range from 0.1% to 10%, based on the total weight of copolyesteramide, which represents 100%.

6. The copolyesteramide as claimed in claim 1, wherein it further comprises at least one other difunctional polymer block having terminal alcohol or amine functions.

7. The copolyesteramide as claimed in claim 6, wherein said polymer is selected from: polyether; polyester; polysiloxane; polyolefin; polycarbonate; and mixtures thereof.

8. A self-flame-retardant copolyesteramide, wherein it is obtained by polycondensation of at least one polyamide monomer with at least one phosphorus-containing diol, wherein the phosphorus-containing diol is selected from oligomeric phosphonate diols of formula:

(II)

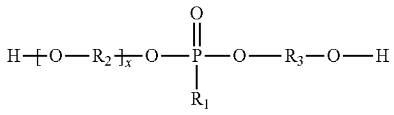

in which:

$R_1$ represents a methyl, ethyl, propyl, butyl or isobutyl group, or a group —[—O—$R_4$] in which $R_4$ represents a methyl, ethyl, propyl or butyl group, $R_2$ and $R_3$ are identical or different and represent a methylene, ethylene or propylene group, and x represents a number from 1 to 10.

9. The copolyesteramide as claimed in claim 8, wherein said at least one polyamide monomer is selected from the following polyamide monomers: 12, 11, 6, 59, 510, 512, 513, 514, 516, 518, 536, 69, 610, 612, 613, 614, 616, 618, 636, 109, 1010, 1012, 1013, 1014, 1016, 1018, 1036, 10T, 129, 1210, 1212, 1213, 1214, 1216, 1218, 1236, 9T, 10T, 11T, 12T, and mixtures thereof.

10. The copolyesteramide as claimed in claim 8, wherein the percentage by weight of atomic phosphorus in the copolymer is within a range from 0.1% to 10%, based on the total weight of copolyesteramide, which represents 100%.

11. The copolyesteramide as claimed in claim 8, wherein it further comprises at least one other difunctional polymer block having terminal alcohol or amine functions.

12. The copolyesteramide as claimed in claim 11, wherein said polymer is selected from: polyether; polyester; polysiloxane; polyolefin; polycarbonate; and mixtures thereof.

13. A non-halogenated flame-retardant composition, wherein comprises at least one copolyesteramide as claimed in claim 1 diluted in a thermoplastic polymer matrix.

14. The composition as claimed in claim 13, wherein said polymer matrix comprises at least one homopolymeric or copolymeric thermoplastic polymer selected from: polyolefins, polyamides, fluoropolymers, saturated polyesters, polycarbonate, styrene resins, PMMA, thermoplastic polyurethanes (TPUs), ethylene-vinyl acetate (EVA) copolymers, copolymers having polyamide blocks and polyether blocks, copolymers having polyester blocks and polyether blocks, copolymers having polyamide blocks, polyether blocks and polyester blocks, copolymers of ethylene and an alkyl (meth)acrylate, copolymers of ethylene and vinyl alcohol (EVOH), ABS, SAN, ASA, polyacetal, polyketones, and mixtures thereof.

15. The composition as claimed in claim 13, comprising from 1% to 99% by weight of said copolyesteramide and from 1% to 99% by weight of said polymer matrix, based on the total weight of the composition, which represents 100%.

16. A non-halogenated flame-retardant composition, wherein comprises at least one copolyesteramide as claimed in claim 8 diluted in a thermoplastic polymer matrix.

17. The composition as claimed in claim 16, wherein said polymer matrix comprises at least one homopolymeric or copolymeric thermoplastic polymer selected from: polyolefins, polyamides, fluoropolymers, saturated polyesters, polycarbonate, styrene resins, PMMA, thermoplastic polyurethanes (TPUs), ethylene-vinyl acetate (EVA) copolymers, copolymers having polyamide blocks and polyether blocks, copolymers having polyester blocks and polyether blocks, copolymers having polyamide blocks, polyether blocks and polyester blocks, copolymers of ethylene and an alkyl (meth)acrylate, copolymers of ethylene and vinyl alcohol (EVOH), ABS, SAN, ASA, polyacetal, polyketones, and mixtures thereof.

18. The composition as claimed in claim 16, comprising from 1% to 99% by weight of said copolyesteramide and from 1% to 99% by weight of said polymer matrix, based on the total weight of the composition, which represents 100%.

19. The composition as claimed in claim 16, wherein it further comprises at least one flame-retardant additive added by physical mixing, and selected from: hydrated fillers of the aluminum trihydroxide and/or magnesium dihydroxide type, melamine derivatives, phosphorus-containing flame retardants, metal salts of phosphinic acid, metal salts of diphosphinic acid, and mixtures thereof.

20. The composition as claimed in claim 13, wherein it further comprises at least one flame-retardant additive added by physical mixing, and selected from: hydrated fillers of the aluminum trihydroxide and/or magnesium dihydroxide type, melamine derivatives, phosphorus-containing flame retardants, metal salts of phosphinic acid, metal salts of diphosphinic acid, and mixtures thereof.

21. An article comprising a copolyesteramide as claimed in claim 1, the article being selected from the group consisting of electrical articles, articles for electrical engineering, tubes, cables, electrical safety articles, molded articles, and articles obtained by 3D printing.

22. An article obtained by injection molding, extrusion, coextrusion, hot compression molding, multi-shot injection molding or by 3D printing from at least one copolyesteramide as claimed claim 1.

23. An article comprising a copolyesteramide as claimed in claim 8, the article being selected from the group consisting of electrical articles, articles for electrical engineering, tubes, cables, electrical safety articles, molded articles, and articles obtained by 3D printing.

24. An article obtained by injection molding, extrusion, coextrusion, hot compression molding, multi-shot injection molding or by 3D printing from at least one copolyesteramide as claimed claim 8.

* * * * *